United States Patent
Kawakami et al.

[11] Patent Number: 6,165,254
[45] Date of Patent: Dec. 26, 2000

[54] GAS CONCENTRATOR

[75] Inventors: Yukito Kawakami; Hiroaki Izumi; Ryuzi Kuramitsu; Tetsuya Kimura, all of Fukuoka-ken, Japan

[73] Assignee: Seibu Giken Co., Ltd., Fukuoka, Japan

[21] Appl. No.: 09/172,768

[22] Filed: Oct. 15, 1998

[30] Foreign Application Priority Data

Oct. 15, 1997 [JP] Japan ................................ 9-299470

[51] Int. Cl.[7] .................................................. B01D 53/06
[52] U.S. Cl. ................................ 96/125; 96/126; 96/150
[58] Field of Search ........................ 96/125, 126, 150, 96/118; 95/113, 114, 115

[56] References Cited

U.S. PATENT DOCUMENTS

| | | | |
|---|---|---|---|
| 3,708,956 | 1/1973 | Norback ........................ | 95/113 |
| 4,377,400 | 3/1983 | Okamoto et al. ................ | 96/118 |
| 4,484,938 | 11/1984 | Okamoto et al. ................ | 96/118 |
| 4,582,129 | 4/1986 | Yano et al. ..................... | 96/118 |
| 4,926,618 | 5/1990 | Ratliff ........................... | 96/125 |
| 5,584,916 | 12/1996 | Yamashita et al. .............. | 96/125 |

FOREIGN PATENT DOCUMENTS

| | | | |
|---|---|---|---|
| 58-8284 | 2/1983 | Japan ............................ | 96/125 |
| 59-130521 | 7/1984 | Japan ............................ | 96/125 |
| 62-97626 | 5/1987 | Japan ............................ | 96/125 |
| 1-99630 | 4/1989 | Japan ............................ | 95/113 |
| 3-188918 | 8/1991 | Japan ............................ | 96/125 |
| 5-115736 | 5/1993 | Japan ............................ | 96/125 |
| 6-31132 | 2/1994 | Japan ............................ | 96/125 |
| 6-63345 | 3/1994 | Japan ............................ | 96/125 |

*Primary Examiner*—Duane S. Smith
*Attorney, Agent, or Firm*—Staas & Halsey LLP

[57] ABSTRACT

A gas concentration device has a gas adsorbing element and a heat exchanger. The gas adsorbing element is divided into an adsorbing zone, and a desorbing zone. The heat exchanger has first and second flow channels. The first flow channels are separated from the second flow channels. The first flow channels receive foggy air having minute particles of water floating therein to cool process air flowing through the second flow channels via heat of vaporization consumed to evaporate the minute particles of water floating in the foggy air of the first flow channels. The second flow channels may be connected to the adsorbing zone of the gas adsorbing element such that process air cooled in the second flow channels is directed to the absorbing zone of the adsorbing element. The gas adsorbing element may further be divided into a cooling zone, such that the gas adsorbing element has absorbing, desorbing and cooling zones. In this case, the cooling and adsorbing zones of the gas adsorbing element may be connected, such that after process air passes through the adsorbing zone, a portion of the process air is directed through the cooling zone. The gas adsorbing element may be formed of a rotor rotatably fitted in a casing, such that as the gas adsorbing element rotates, the adsorbing, desorbing and cooling zones of the gas adsorbing element dynamically change and the rotor repeatedly rotates through the adsorbing section, followed by the desorbing section followed by the cooling section.

29 Claims, 7 Drawing Sheets

GAS CONCENTRATOR

BACKGROUND OF THE INVENTION

1. Field of the Invention

The present invention relates in general to a gas concentration device and more particularly to a gas concentration device having a cooled adsorbing element.

2. Description of the Related Art

Heretofore a gas adsorption honeycomb rotor formed of a wound laminate of a corrugated thin sheet and a flat sheet, with gas adsorbents such as silica gel and/or zeolite on the surface of the laminate, has been marketed. Recently, gas concentration devices having gas adsorption rotors have been adopted for use in pollution preventing equipment, and thus, the usage is extending.

A prior gas concentration device is explained referring to FIG. 12. Honeycomb rotor element 1 consists of a flat thin sheet and a corrugated thin sheet. Honeycomb rotor 1 has particles of the gas adsorbents such as silica gel and zeolite on the surface. A geared motor 2 has reduction gears to rotate the rotor element 1 through belt 3.

Casing 4 supports above-mentioned geared motor 2, belt 3 and rotor element 1 rotatively. Moreover, seal 5 creates an airtight seal between rotor element 1 and casing 4. In addition, casing 4 is divided into an adsorbing zone 6 and a desorbing zone 7. Blower 9 blows the process air to remove gas or to dehumidify. The dust in desorption air is removed by filter 10, the air is heated by desorption air heater 11 and sent to desorbing zone 7.

The function of the prior gas concentration device will now be explained. The rotor element 1 is driven by geared motor 2 and process air blower 9 sends the process air such as the indoor air through adsorbing zone 6. The gas or moisture in the process air are adsorbed by the adsorbent particles attached to the surface of rotor element 1 in adsorbing zone 6. As the rotor element 1 rotates, the portion that adsorbed the gas or moisture moves to desorbing zone 7. Because the hot air heated by the desorption air heater 11 enters the desorbing zone 7 by force of blower 12, the portion of the rotor element 1 in desorbing zone 7 is heated by the hot air and adsorbed gas or moisture are desorbed from the portion. Thus, the gas concentration device removes the gas or moisture in the process air and discharges the gas or moisture to the desorption air. If the gas discharged in the desorption air is a harmful gas such as an organic solvent vapor, the gas is changed into a harmless gas by means of incineration etc. and is discharged into the atmosphere.

The prior gas concentration device is able to remove gas or moisture in the process air as above-mentioned. However, there is a problem that the ability to remove gas or moisture from the process air decreases with increasing process air temperature. If the process air is cooled with a conventional refrigerator having a compressor, the refrigerator consumes a lot of energy for cooling and the processing cost becomes high. In addition, there is a problem of the exhaust of carbon dioxide because there is a lot of energy consumption. There are also problems associated with using Freon as the refrigerant in the refrigerator. Further, refrigerators are expensive because of their complex structure.

SUMMARY OF THE INVENTION

Accordingly, it is an object of the present invention to provide a gas concentration device that does not experience decreased adsorption at high temperatures.

It is a further object of the present invention to provide a gas concentration device that does not consume a lot of energy.

It is another object of the present invention to provide a gas concentration device that does not use Freon or require the emission of carbon dioxide.

It is a still object of the present invention to provide a gas concentration device that is inexpensive.

These and other objects are accomplished by providing a gas concentration device having a gas adsorbing element and a heat exchanger. The gas adsorbing element is divided into an adsorbing zone, and a desorbing zone. The heat exchanger has first and second flow channels. The first flow channels are separated from the second flow channels. The first flow channels receive foggy air having minute particles of water floating therein to cool process air flowing through the second flow channels via heat of vaporization consumed to evaporate the minute particles of water floating in the foggy air of the first flow channels. The second flow channels may be connected to the adsorbing zone of the gas adsorbing element such that process air cooled in the second flow channels is directed to the absorbing zone of the adsorbing element.

The gas adsorbing element may further be divided into a cooling zone, such that the gas adsorbing element has absorbing, desorbing and cooling zones. In this case, the cooling and adsorbing zones of the gas adsorbing element may be connected, such that after process air passes through the adsorbing zone, a portion of the process air is directed through the cooling zone.

If the gas adsorbing element has a cooling zone, the process air cooled in the second passages of the heat exchanger may be sent through the cooling zone of the gas adsorbing element instead of the adsorbing zone of the gas adsorbing element. As a further alternative, the process air cooled in the second passages of the heat exchanger may be sent through both the cooling zone and the adsorbing zone of the gas adsorbing element.

The gas adsorbing element may be formed of a rotor rotatably fitted in a casing, such that as the gas adsorbing element rotates, the adsorbing, desorbing and cooling zones of the gas adsorbing element dynamically change and the rotor repeatedly rotates through the adsorbing section, followed by the desorbing section followed by the cooling section.

BRIEF DESCRIPTION OF THE DRAWINGS

The invention will be readily understood by reference to the following description of specific embodiments described by way of example only, with reference to the accompanying drawings, wherein:

FIG. 2b is an enlarged view of a portion of device shown in FIG. 2a;

DETAILED DESCRIPTION OF THE PREFERRED EMBODIMENTS

Figure 1:
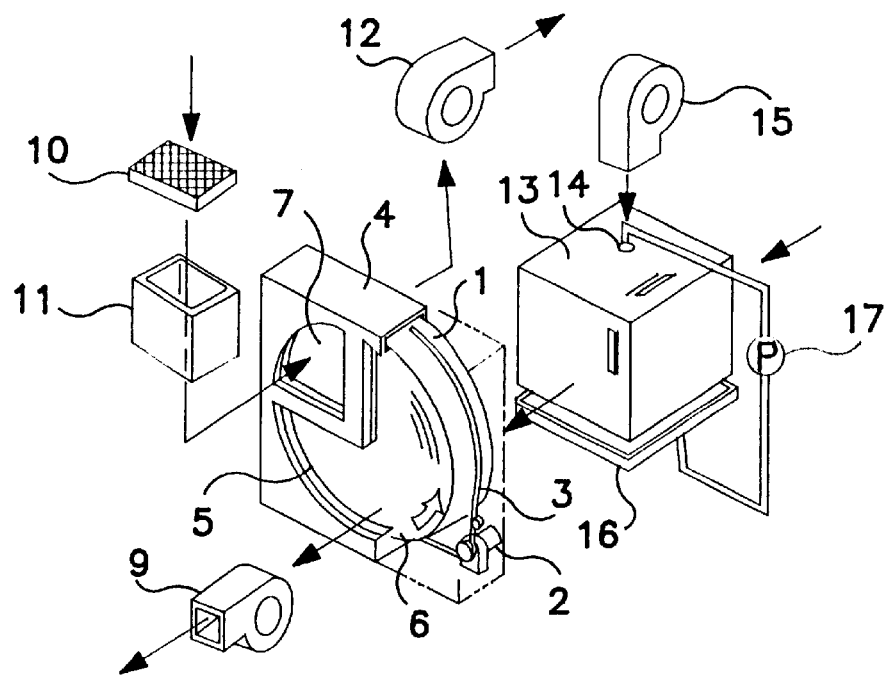
FIG. 1 is a perspective view of a first example of a gas concentration device according to the present invention.

The first embodiment of the present invention will now be described in accordance with FIG. 1 and FIGS. 2a and 2b. To simplify the description of the preferred embodiments, like elements are denoted by like reference numbers and a duplicate description thereof will be omitted. Honeycomb rotor element 1 has gas adsorbent particles such as silica gel and/or zeolite formed on the surface thereof. Geared motor 2 has reduction gears to rotate the rotor element 1 through belt 3.

Casing 4 stores geared motor 2 and belt 3 and supports the rotor element 1 rotatably. Seal 5 makes an airtight condition between rotor element 1 and casing 4. In addition, casing 4 is divided into adsorbing zone 6 and desorption zone 7.

Blower 9 for the process air and adsorbing zone 6 of casing 4 are connected with ducts (not shown in the drawing). Blower 9 for the process air sends the process air to adsorbing zone 6.

Filter 10 and desorption air heater 11 are connected with ducts (not shown in the drawing) so that dust is removed by filter 10 before the air enters desorption air heater 11. Desorption air heater 11 and desorbing zone 7 of casing 4 are connected with a duct (not shown in the drawing).

Blower 12 for the desorption air and desorbing zone 7 of casing 4 are connected with ducts (not shown in the drawing). The heated air heated by desorption air heater 11 is sent through desorbing zone 7 by blower 12.

Sprayer 14 is installed in front of one group of channels of cross-flow heat exchanger 13. In addition, cooling air blower 15 is installed in front of sprayer 14. Water tank 16 is installed under the channels of the cross-flow heat exchanger 13 through which water is introduced. Water that was not able to evaporate in the cross-flow heat exchanger 13 gathers here. The other air group of channels of the cross-flow heat exchanger 13 and the air channel at adsorbing zone 6 of casing 4 are connected each other. Pump 17 sucks up and pressurizes the water from water tank 16 and sends the water to sprayer 14. Because water is sprayed in the air flow created by cooling air blower 15, this airflow is saturated with water vapor and a large amount of minute particles of water float.

Figure 2A:
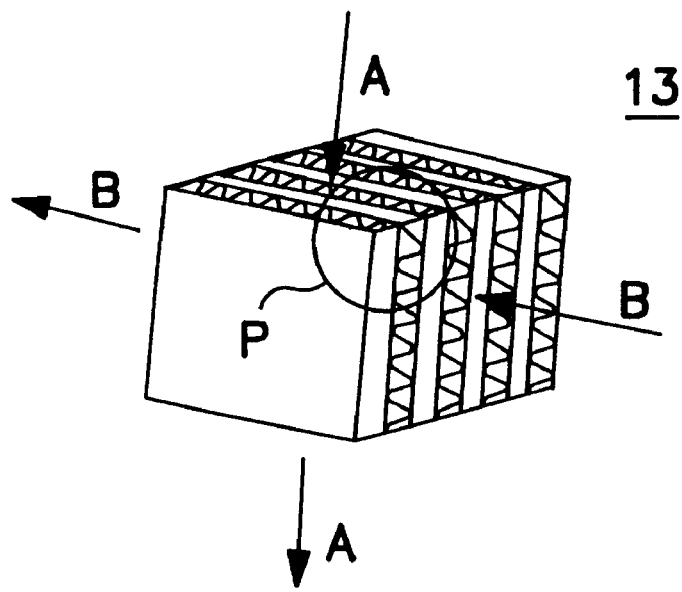
FIG. 2a is a perspective view of a cross-flow heat-exchanger used in the present invention.
Figure 2B:
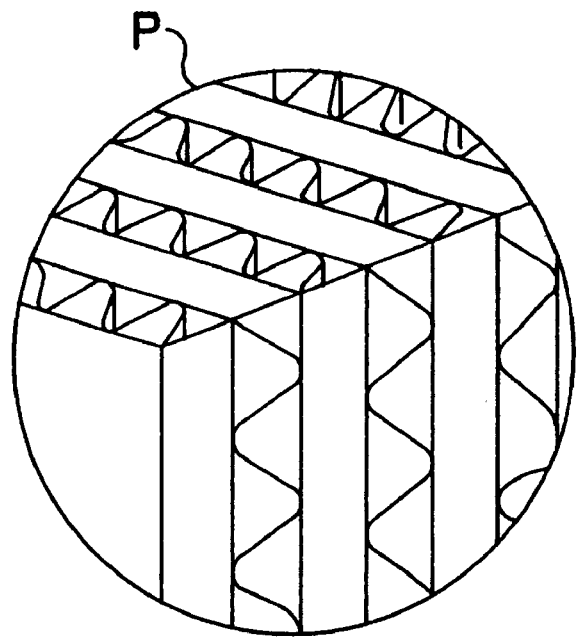

FIG. 2a is a perspective view of cross-flow heat exchanger 13 and FIG. 2b is an enlarged perspective view of a portion of the device shown in FIG. 2a. The cross-flow heat exchanger 13 is made by piling up corrugated aluminum sheets and aluminum flat sheets alternately, and the sheets are bonded each other. That is, two groups of fluid channels A and B are formed in the heat exchanger 13, which channels have the aluminum sheets as wall surfaces. Namely, the channels A and B are in a cross-flow arrangement with channels A and B mutually separated with aluminum sheets. The opening ratio of each small channel group of the cross-flow heat exchanger 13 is about 0.4 and the heat exchange efficiency is 97.9%.

Ducts are installed to secure the flow of the desorption air from filter 10 through desorption air heater 11 and desorbing zone 7 to desorption air blower 12 as shown in FIG. 1. Ducts are also installed to secure the flow of the process air from the cross-flow heat exchanger 13 through adsorbing zone 6 to process air blower 9. Ducts are further installed to secure the flow of the cooling air from cooling air blower 15 to one group of the cooling air channels of the cross-flow heat exchanger 13. Thus, three sets of ducts secure the flow of the fluids described above.

The gas concentration device of the present invention works as follows. Water is sprayed in the air with sprayer 14 before entering one group of channels of the cross-flow heat exchanger 13, when cooling air blower 15 and pump 17 are started. Water evaporates by this spray and the temperature from blower 15 decreases below the outer air temperature due to the heat of vaporization of the water. Air, which passed in front of sprayer 14, becomes the state that an enormous amount of minute particles of water float in the air and the relative humidity increases to 100% when the sprayed water particles evaporate.

The air to be treated is pulled by the process air blower 9 through the other group of channels of the cross-flow heat exchanger 13. The air to be treated exchanges sensible heat with the water-entrenched air sent through the other group of channels of the cross-flow heat exchanger 13. That is, the temperature of the water-entrenched air increases to a little less than the outer air temperature by the sensible heat exchange. When the temperature increases, the relative humidity of the water-entrenched air becomes less than 100% and a large amount of the minute particles of water which float in the air evaporate rapidly. The heat of vaporization removes more heat from the air to be treated flowing through the other group of channels of the heat exchanger 13. Thus, the water-entrenched air sent through one group of channels of the cross-flow heat exchanger 13 is kept at an almost constant temperature and air sent through the other group of channels is cooled continuously.

After passing through the cross-flow heat exchanger 13 and water tank 16, the water-entrenched air is discharged. A portion of the particles of water remaining without evaporating are discharged in the atmosphere and the remainder drops in water tank 16.

The results of an experiment by applicants are as follows. The velocity of the air that passed the cross-flow heat exchanger 13 via cooling air blower 15 was set to 1.0 m/second. A cubic cross-flow heat exchanger 13 having 0.25 m long sides was used. The temperature of air originally at a temperature of 26.2° C. and a relative humidity of 78% was cooled to a temperature of 22.7° C.

It is thus clear that the temperature of the air to be treated in rotor element 1 decreased to a temperature in which adsorbent such as silica gel and/or zeolite works efficiently. Based on these experiments of the applicants, it also is clear that the first embodiment of the present invention can be realized.

Figure 3:
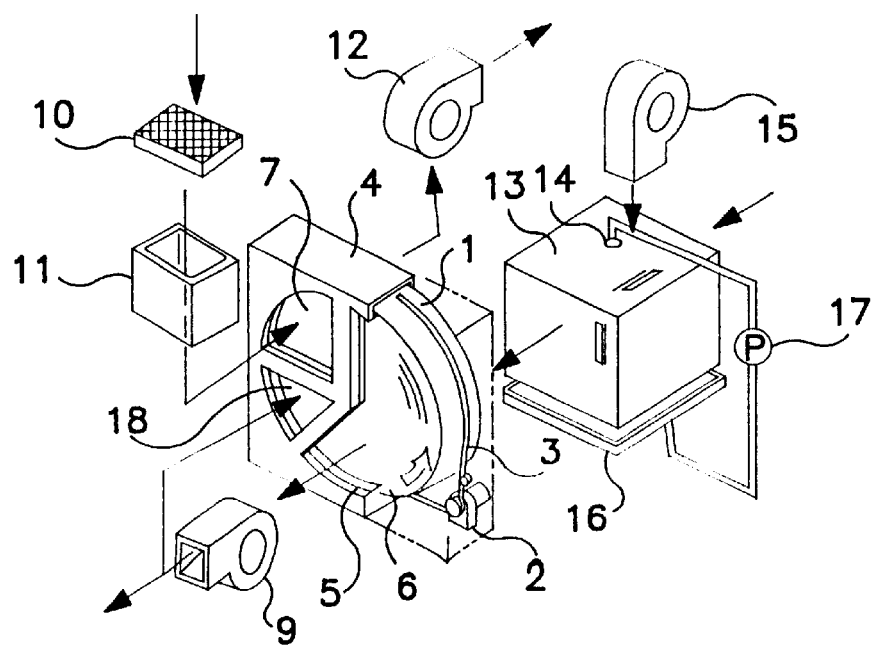
FIG. 3 is a perspective view of a second example of a gas concentration device according to the present invention.

The second embodiment of the present invention will now be explained referring to FIG. 3. According to the second embodiment, a cooling zone 18 that is a part of casing 4 is provided to cool rotor element 1 heated with the desorption air. Part of the air discharged from the process air blower 9 is sent to this cooling zone 18 with a duct (not shown in the drawing). The air which exits the cooling zone 18 may be discharged into the atmosphere by blower 12.

In the dehumidifier shown in the second embodiment as mentioned above, the rotor element 1 can dehumidify in the adsorbing zone 6 very effectively, because rotor element 1 heated by the reactivation is cooled with cool and dry air. Moreover, it can adsorb the gas mixed with air extremely effectively. Based on the experiments of the applicants, it is clear that the second embodiment of the present invention can be realized.

Figure 4:
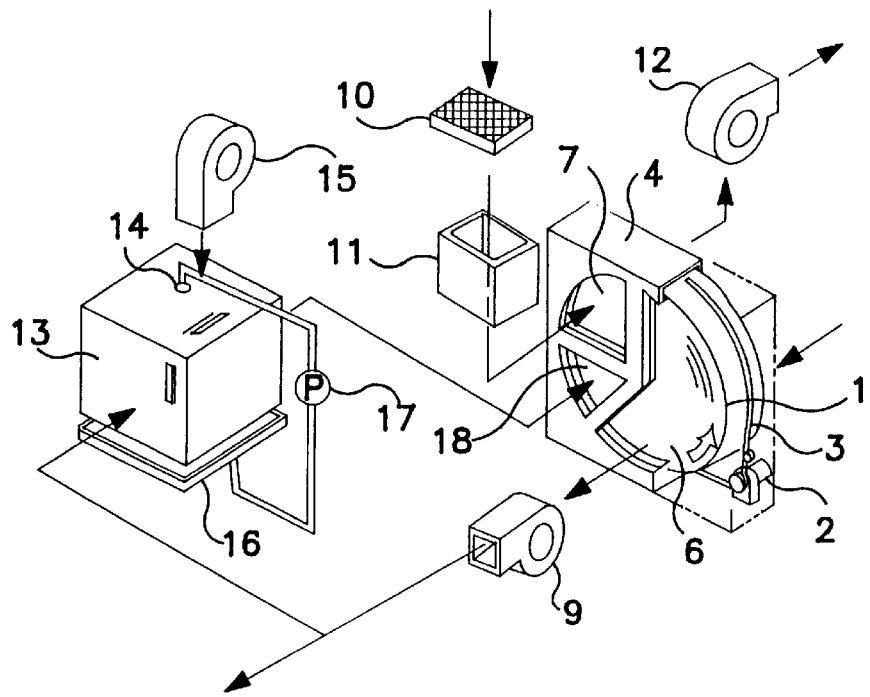
FIG. 4 is a perspective view of a third example of a gas concentration device according to the present invention.

The third embodiment of the present invention will now be explained with reference to FIG. 4. According to the third embodiment, the process air enters directly into adsorbing zone 6, is processed and refreshed and is then sent back indoors as a fresh air supply by blower 9. A portion of the processed and refreshed air is sent to cooling zone 18 with ducts (not shown in the drawing). This air is first sent through the cross-flow heat exchanger 13 for cooling. After exiting the cooling zone 18 the air is discharged into an atmosphere by pressure of blower 9.

In the third embodiment of the present invention as constructed above, because a portion of the processed and refreshed air is sent to cooling zone 18 after being refrigerated by the cross-flow heat exchanger 13, the rotor element 1 can be cooled where the temperature rose from the desorption air. The rotor element 1 is cooled with cool dry air. Therefore, air can be dehumidified extremely effectively in adsorbing zone 6. Based on the experiments of the applicants, it is clear that the third embodiment of the present invention can be realized.

Figure 5:
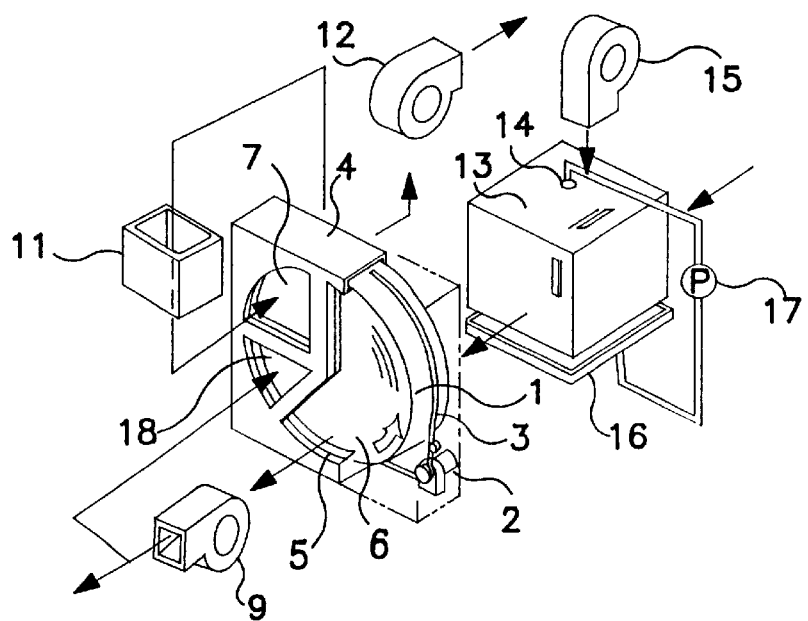
FIG. 5 is a perspective view of a four example of a gas concentration device according to the present invention.

The fourth embodiment of the present invention will now be described with reference to FIG. 5. According to the fourth embodiment, the air which exited from cooling zone 18 is led to desorption air heater 11 with a duct (not shown in the drawing). Because the air led to desorption air heater 11 has already passed rotor element 1, a filter is not installed before desorption air heater 11.

Similar to the third embodiment, rotor element 1 is cooled in cooling zone 18 after being heated by desorption air. Rotor element 1 can thus dehumidify air or adsorb gas mixed in the air with extreme efficiency in adsorbing zone 6. In addition, the air is partially heated when it passes through cooling zone 18. Thus, less heating is necessary by desorption air heater 11, and energy consumption is reduced. Based on the experiments of the applicants, it is clear that the fourth embodiment of the present invention can be realized.

Figure 6:
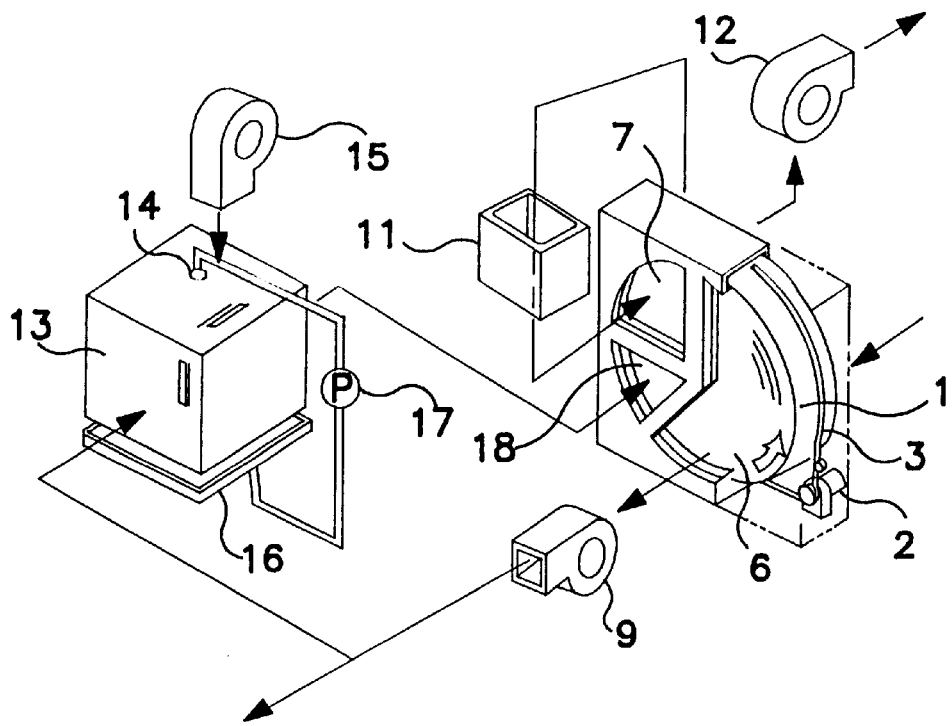
FIG. 6 is a perspective view of a fifth example of a gas concentration device according to the present invention.

The fifth embodiment of the present invention will now be described with reference to FIG. 6. The fifth embodiment is similar to one or more of the previous embodiments in that air which exited from cooling zone 18 is led to desorption air heater 11 with the ducts (not shown in the drawing). Because the air led to desorption air heater 11 has already passed rotor element 1, a filter is not installed before desorption air heater 11. Also, rotor element 1 is cooled in cooling zone 18 after being heated by desorption air. Rotor element 1 can thus dehumidify air or adsorb gas mixed in the air with extreme efficiency in adsorbing zone 6. In addition, the air is partially heated when it passes through cooling zone 18. Thus, less heating is necessary by desorption air heater 11, and energy consumption is reduced.

In the gas adsorbing device of this embodiment the temperature of the air entering adsorbing zone 6 is higher than that of the fourth embodiment. However, the temperature of the air which enters cooling zone 18 is lower than that of the fourth embodiment. Thus, this embodiment is most effective when the temperature of the process air is comparatively low and a high temperature is needed for the desorption. Based on the experiments of the applicants, it is clear that the fifth embodiment of the present invention can be realized.

Figure 7:
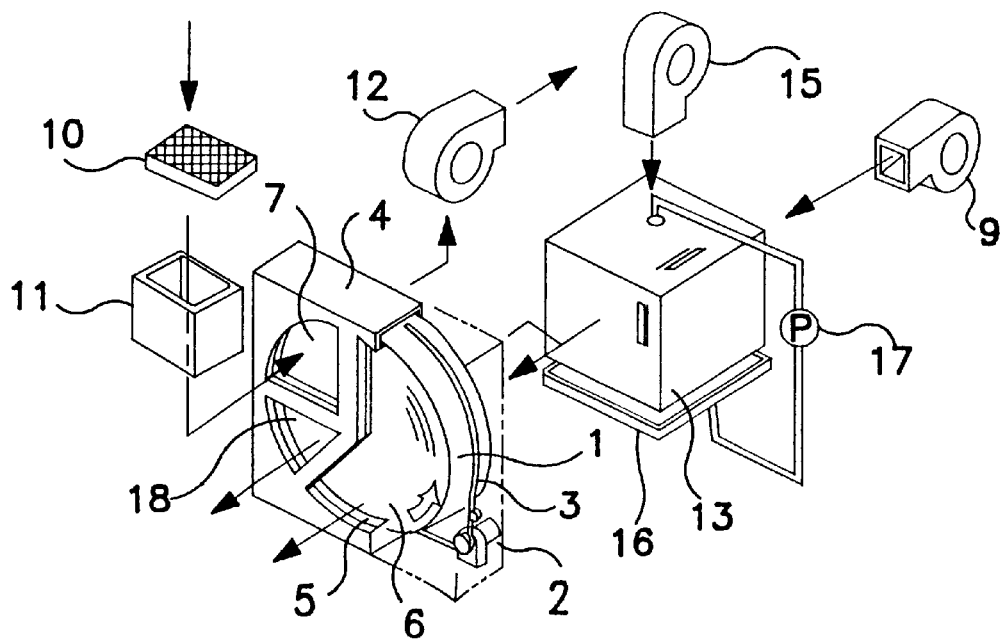
FIG. 7 is a perspective view of a sixth example of a gas concentration device according to the present invention.

The sixth embodiment of the present invention will now be described with reference to FIG. 7. The point of difference from the second embodiment shown in FIG. 3 is as follows. According to the sixth embodiment, the process air blower 9 is installed at the inlet side of cross-flow heat exchanger 13. In addition, a duct from the outlet of the cross-flow heat exchanger 13 divides the cooled air in two. One portion is led to adsorbing zone 6, and the other portion is led to cooling zone 18. After passing cooling zone 18, the air is discharged into the atmosphere. Rotor element 1 is cooled in cooling zone 18 after being heated by desorption air. Rotor element 1 can thus dehumidify air or adsorb gas mixed in the air with extreme efficiency in adsorbing zone 6.

In the gas-concentration device of this embodiment, because the air goes directly from the cross-flow heat exchanger 13 to cooling zone 18, the temperature of the air entering cooling zone 18 is low. Therefore, this embodiment is most effective when the area of cooling zone 18 is limited or when the temperature of the rotor element 1 must be minimized due to characteristics thereof. Based on the experiments of the applicants, it is clear that the sixth embodiment of the present invention can be realized.

Figure 8:
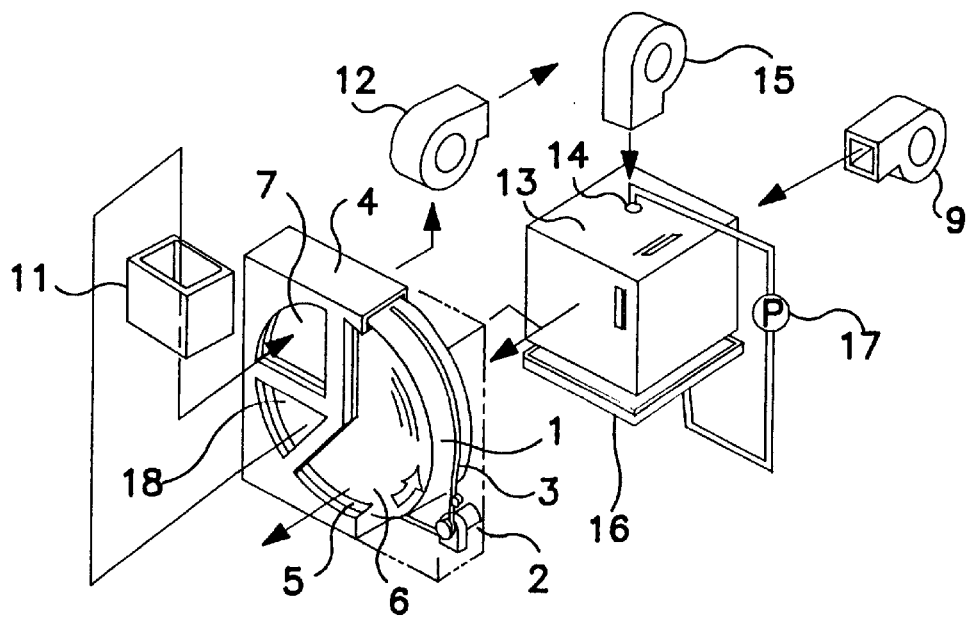
FIG. 8 is a perspective view of a seventh example of a gas concentration device according to the present invention.

The seventh embodiment of the present invention will now be described with reference to FIG. 8. The point of difference from the sixth embodiment shown in FIG. 7 is described as follows. According to the seventh embodiment, the air exiting from the cooling zone 18, is led to desorption air heater 11. Because the air led to desorption air heater 11 has already passed rotor element 1, a filter is not installed before desorption air heater 11.

Because rotor element 1 is cooled by cool air after being heated during desorption, the rotor element 1 of the seventh embodiment of the present invention can dehumidify air extremely effectively in adsorbing zone 6. In addition, the air is partially heated when it passes through cooling zone 18. Thus, less heating is necessary by desorption air heater 11, and energy consumption is reduced. Based on the experiments of the applicants, it is clear that the seventh embodiment of the present invention can be realized.

Figure 9:
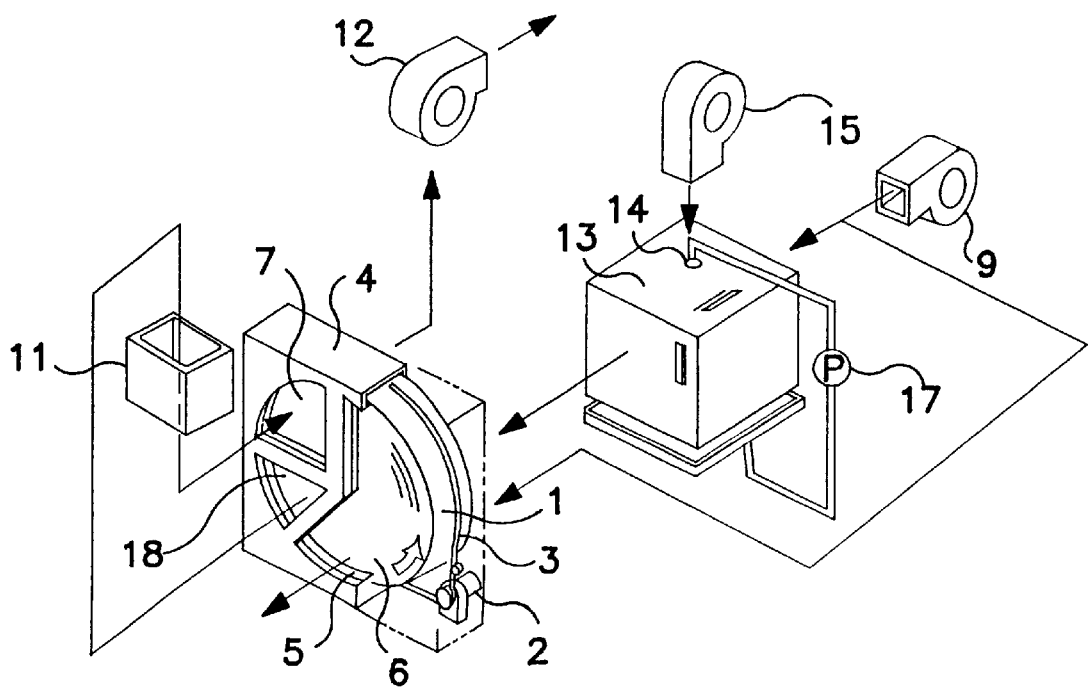
FIG. 9 is a perspective view of an eighth example of a gas concentration device according to the present invention.

The eighth embodiment of the present invention will now be described with reference to FIG. 9. The point of difference from the seventh embodiment shown in FIG. 8 is as follows. According to the eighth embodiment, air emitted by blower 9 is divided into two portions. A first portion enters cross-flow heat exchanger 13, and a second portion enters adsorbing zone 6. After the first portion of air passes through the cross-flow heat exchanger 13 and is cooled, it is sent through cooling zone 18.

Because rotor element 1 is cooled by cool air in cooling zone after being heated during desorption, the rotor element 1 of the eighth embodiment of the present invention can dehumidify air extremely effectively in adsorbing zone 6. Further, in this embodiment all air cool air discharged from the cross-flow heat exchanger 13 enters in cooling zone 18. Thus, this embodiment shows a higher cooling effect of cooling zone 18 than the one of the sixth embodiment. Based on the experiments of the applicants, it is clear that the eighth embodiment of the present invention can be realized.

Figure 10:
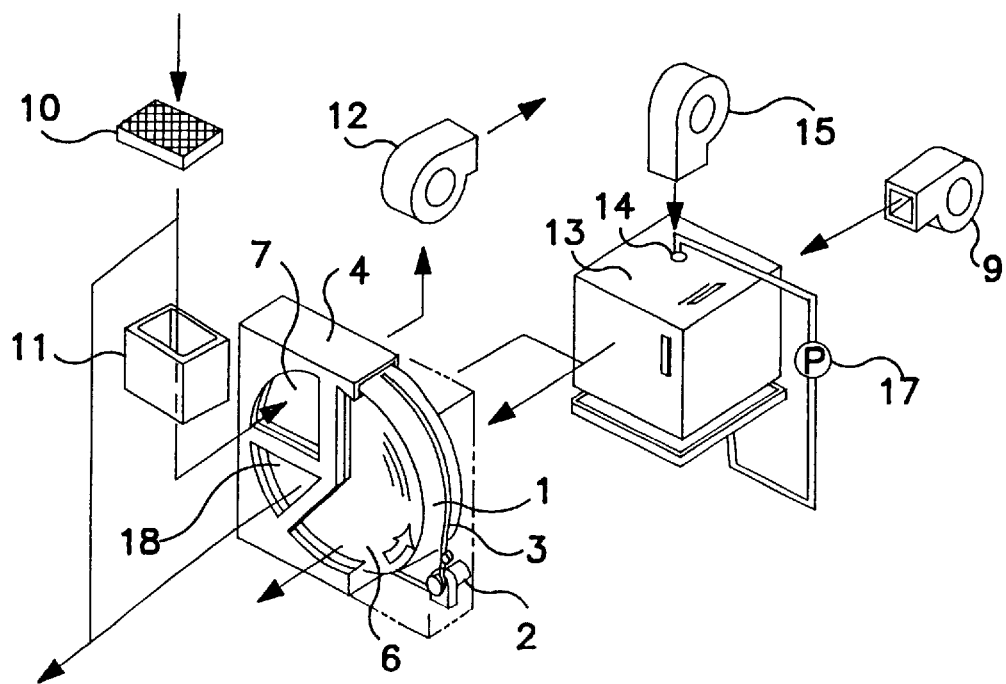
FIG. 10 is a perspective view of a ninth example of a gas concentration device according to the present invention.

The ninth embodiment of the present invention will now be described with reference to FIG. 10. The point of difference from the seventh embodiment shown in FIG. 8 is as follows. According to the ninth embodiment, a first portion of the air from cooling zone 18 is discharged to the atmosphere. In addition, outside air is passed through filter 10. Filtered outside air is combined with a second portion of the air from cooling zone 18 and the combined air is sent through desorption air heater 11.

Because rotor element 1 is cooled by cool air in cooling zone after being heated during desorption, the rotor element 1 of the ninth embodiment of the present invention can dehumidify air or adsorb gas mixed in the air extremely effectively in adsorbing zone 6. In addition, because a part of the hot air from cooling zone 18 is sent to the desorption air heater 11, energy consumption of desorption air heater 11 can be reduced. Further, because the outside air is mixed with hot air from cooling zone 18 before entering the desorption air heater 11, the temperature of the air entering the desorption air heater 11 can be adjusted by adjusting the feed ratio of the outside air to hot air. Based on the experiments of the applicants, it is clear that the ninth embodiment of the present invention can be realized.

Figure 11:
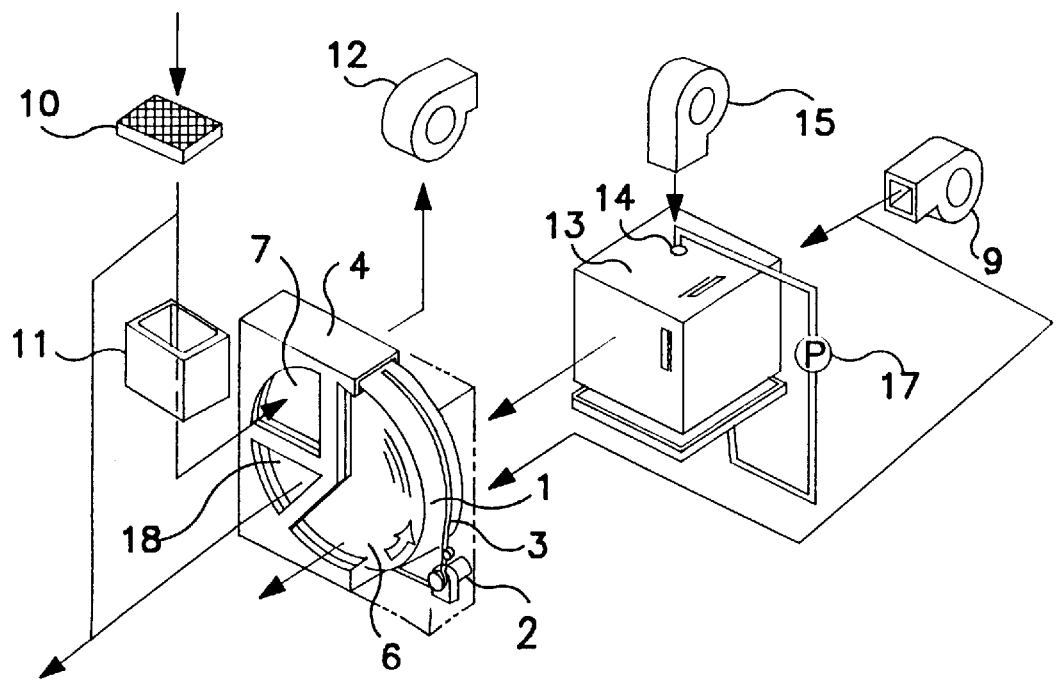
FIG. 11 is a perspective view of a tenth example of a gas concentration device according to the present invention.
Figure 12:
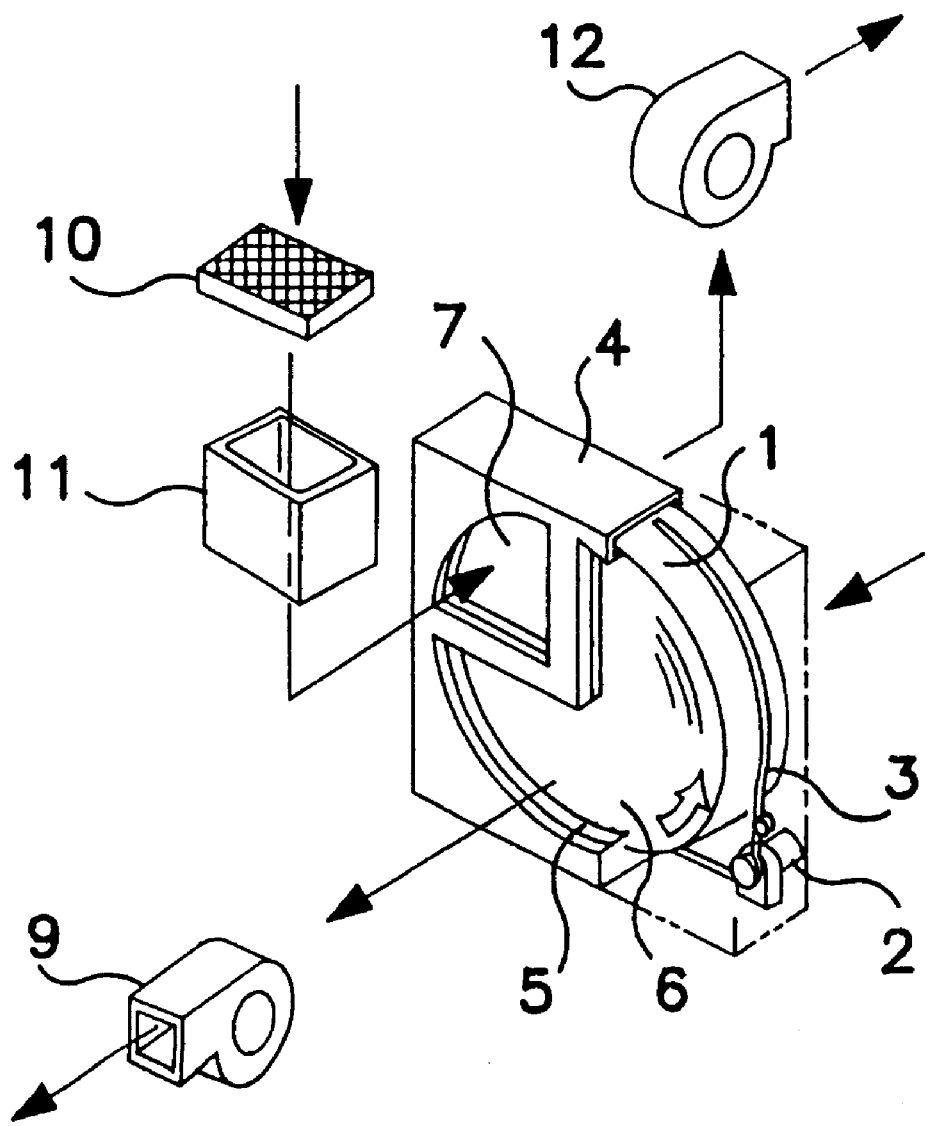
FIG. 12 is a perspective view of a related art gas concentration device.

The tenth embodiment of the present invention will now be described with reference to FIG. 11. The point of difference from the eighth embodiment shown in FIG. 9 is as follows. According to the tenth embodiment, a first portion of the air from cooling zone 18 is discharged to the atmosphere. In addition, outside air is passed through filter 10. Filtered outside air is combined with a second portion of the air from cooling zone 18 and the combined air is sent through desorption air heater 11.

The tenth embodiment of the present invention has similar characteristics to that of above-mentioned ninth embodiment. The outside air and the air from cooling zone 18 are mixed and are led to desorption air heater 11. The temperature of the air entering into desorption air heater 11 can be adjusted by adjusting the feed ratio of the outside air to hot air. Based on the experiments of the applicants, it is clear that the tenth embodiment of the present invention can be realized.

The gas concentration device of the present invention continuously reduces the temperature of the process air flowing through second channels of a heat exchanger having first and second channels. The process air is cooled from vaporization heat of a large amount of minute particles of the liquid included in a gas-liquid mixture flowing through the first channels of the heat exchanger. Air cooled in the second channels may be directed through the adsorption zone of the gas adsorption element. Therefore, process air is cooled until reaching an appropriate temperature. Even if the temperature of the process air was high, gas adsorbing properties of the adsorbing element are maintained high.

The gas concentration device of the present invention consumes less energy, and therefore, operating expenses are reduced. In addition, because less energy is consumed, carbon dioxide exhaust is less of a problem. Further, because the device does not use a refrigerant such as Freon, recovery of such a refrigerant does not pose a problem. Moreover, the device is simple and can be made cheaply.

While the invention has been described in connection with the preferred embodiments, it will be understood that modifications within the principles outlined above will be evident to those skilled in the art. Thus, the invention is not limited to the preferred embodiments, but is intended to encompass such modifications.

What is claimed is:

1. A gas concentration device comprising:
  a gas adsorbing element divided into an adsorbing zone and a desorbing zone; and
  a heat exchanger having first and second flow channels, the first flow channels being separated from the second flow channels, the first flow channels receiving foggy air having minute particles of water floating therein to cool process air flowing through the second flow channels via heat of vaporization consumed to evaporate the minute particles of water floating in the foggy air of the first flow channels, the second flow channels being connected to the adsorbing zone of the gas adsorbing element such that process air cooled in the second flow channels is directed to the absorbing zone of the adsorbing element.

2. A gas concentration device according to claim 1, wherein:
  the gas adsorbing element is further divided into a cooling zone, such that the gas adsorbing element has absorbing, desorbing and cooling zones,
  the cooling and adsorbing zones of the gas adsorbing element are connected, and
  after process air passes through the adsorbing zone, a portion of the process air is directed through the cooling zone.

3. A gas concentration device according to claim 2, further comprising a casing divided into adsorbing, desorbing and cooling sections, the gas adsorbing element being formed of a honeycomb rotor rotatably fitted in the casing, such that as the gas adsorbing element rotates, the adsorbing, desorbing and cooling zones of the gas adsorbing element dynamically change, the honeycomb rotor repeatedly rotating through the adsorbing section, followed by the desorbing section followed by the cooling section.

4. A gas concentration device according to claim 1, further comprising a casing divided into adsorbing and desorbing sections, the gas adsorbing element being movably fitted in the casing, such that as the gas adsorbing element is moved through the casing, the adsorbing and desorbing zones of the gas adsorbing element dynamically change.

5. A gas concentration device according to claim 1, wherein the second flow channels of the heat exchanger are connected to the adsorbing zone of the gas adsorbing element through ducts.

6. A gas concentration device according to claim 1, further comprising a heater to supply heated air to the desorbing zone of the gas adsorbing element.

7. A gas concentration device comprising:
  a gas adsorbing element divided into an adsorbing zone, a desorbing zone and a cooling zone; and
  a heat exchanger having first and second flow channels, the first flow channels being separated from the second flow channels, the first flow channels receiving foggy air having minute particles of water floating therein to cool process air flowing through the second flow channels via heat of vaporization consumed to evaporate the minute particles of water floating in the foggy air of the first flow channels, the second flow channels each having an inlet and an outlet, the inlets of the second flow channels being connected to the adsorbing zone of the gas adsorbing element to receive process air after it has passed through 41 the adsorbing zone, the outlets of the second flow channels being connected to the cooling zone to supply process air to the cooling zone.

8. A gas concentration device according to claim 7, wherein the cooling and desorbing zones of the gas adsorbing element are connected such that the desorbing zone receives process air after it has passed through the cooling zone.

9. A gas concentration device according to claim 7, further comprising a casing divided into adsorbing, desorbing and cooling sections, the gas adsorbing element being formed of a rotor rotatably fitted in the casing, such that as the gas adsorbing element rotates, the adsorbing, desorbing and cooling zones of the gas adsorbing element dynamically change.

10. A gas concentration device according to claim 9, wherein the direction of rotation of the rotor is such that the rotor repeatedly rotates through the adsorbing section, followed by the desorbing section followed by the cooling section.

11. A gas concentration device according to claim 7, wherein the inlets of the second flow channels are connected to the adsorbing zone through a duct and the outlets of the second flow channels are connected to the cooling zone through a duct.

12. A gas concentration device comprising:
a gas adsorbing element divided into an adsorbing zone, a desorbing zone and a cooling zone; and
a heat exchanger having first and second flow channels, the first flow channels being separated from the second flow channels, the first flow channels receiving foggy air having minute particles of water floating therein to cool process air flowing through the second flow channels via heat of vaporization consumed to evaporate the minute particles of water floating in the foggy air of the first flow channels, the second flow channels being connected to the adsorbing zone of the gas adsorbing element such that process air cooled in the second flow channels is directed to the absorbing zone of the adsorbing element,
the adsorbing and cooling zones of the gas adsorbing element being connected such the cooling zone receives a portion of the process air after it passes through the adsorbing zone,
the cooling and desorbing zones of the gas adsorbing element being connected such that the desorbing zone receives process air after it has passed through the cooling zone.

13. A gas concentration device according to claim 12, further comprising a casing divided into adsorbing, desorbing and cooling sections, the gas adsorbing element being formed of a rotor rotatably fitted in the casing, such that as the gas adsorbing element rotates, the adsorbing, desorbing and cooling zones of the gas adsorbing element dynamically change.

14. A gas concentration device according to claim 13, wherein the direction of rotation of the rotor is such that the rotor repeatedly rotates through the adsorbing section, followed by the desorbing section followed by the cooling section.

15. A gas concentration device according to claim 12, wherein the adsorbing and cooling zones of the gas adsorbing element and the cooling and desorbing zones of the gas adsorbing element are respectively connected by ducts.

16. A gas concentration device according to claim 12, wherein air is sent through a heater after passing through the cooling zone of the gas adsorbing element and before introduction to the desorbing zone of the gas adsorbing element.

17. A gas concentration device comprising:
a gas adsorbing element divided into an adsorbing zone, a desorbing zone and a cooling zone; and
a heat exchanger having first and second flow channels, the first flow channels being separated from the second flow channels, the first flow channels receiving foggy air having minute particles of water floating therein to cool process air flowing through the second flow channels via heat of vaporization consumed to evaporate the minute particles of water floating in the foggy air of the first flow channels, the second flow channels being connected to the adsorbing and cooling zones of the gas adsorbing element such that a one portion of the process air cooled in the second flow channels is directed to the absorbing zone of the adsorbing element and another portion of the process air cooled in the second flow channels is directed to the cooling zone of the adsorbing element.

18. A gas concentration device according to claim 17, wherein the cooling and desorbing zones of the gas adsorbing element are connected such that the desorbing zone receives process air after it has passed through the cooling zone.

19. A gas concentration device according to claim 18, wherein outside air is mixed with the process air from the cooling zone of the adsorbing element such that a mixture of outside air and process air is directed through the desorbing zone of the absorbing element.

20. A gas concentration device according to claim 17, further comprising a casing divided into adsorbing, desorbing and cooling sections, the gas adsorbing element being formed of a rotor rotatably fitted in the casing, such that as the gas adsorbing element rotates, the adsorbing, desorbing and cooling zones of the gas adsorbing element dynamically change.

21. A gas concentration device according to claim 20, wherein the direction of rotation of the rotor is such that the rotor repeatedly rotates through the adsorbing section, followed by the desorbing section followed by the cooling section.

22. A gas concentration device according to claim 17, wherein the second flow channels of the heat exchanger are connected to the adsorbing and cooling zones of the gas adsorbing element through respective ducts.

23. A gas concentration device according to claim 17, further comprising a heater to supply heated air to the desorbing zone of the gas adsorbing element.

24. A gas concentration device comprising:
a gas adsorbing element divided into an adsorbing zone, a desorbing zone and a cooling zone; and
a heat exchanger having first and second flow channels, the first flow channels being separated from the second flow channels, the first flow channels receiving foggy air having minute particles of water floating therein to cool process air flowing through the second flow channels via heat of vaporization consumed to evaporate the minute particles of water floating in the first flow channels, the second flow channels being connected to the cooling zone of the gas adsorbing element such that the process air cooled in the second flow channels is directed to the cooling zone of the adsorbing element,
the cooling and desorbing zones of the gas adsorbing element being connected such that the desorbing zone receives process air after it has passed through the cooling zone.

25. A gas concentration device according to claim 24, wherein outside air is mixed with the process air from the cooling zone of the adsorbing element such that a mixture of outside air and process air is directed through the desorbing zone of the absorbing element.

26. A gas concentration device according to claim 24, further comprising a casing divided into adsorbing, desorbing and cooling sections, the gas adsorbing element being formed of a rotor rotatably fitted in the casing, such that as the gas adsorbing element rotates, the adsorbing, desorbing and cooling zones of the gas adsorbing element dynamically change.

27. A gas concentration device according to claim 26, wherein the direction of rotation of the rotor is such that the rotor repeatedly rotates through the adsorbing section, followed by the desorbing section followed by the cooling section.

28. A gas concentration device according to claim 24, wherein the second flow channels of the heat exchanger are connected to the cooling zone of the gas adsorbing element through a duct and the cooling and desorbing zones of the gas adsorbing element are connected through a duct.

29. A gas concentration device according to claim 24, wherein air is sent through a heater after passing through the cooling zone of the gas adsorbing element and before introduction to the desorbing zone of the gas adsorbing element.

* * * * *